US012722827B2

(12) United States Patent
Leykin

(10) Patent No.: US 12,722,827 B2
(45) Date of Patent: Sep. 1, 2026

(54) DISPENSING DEVICE FOR TRAYS IN HOT FOOD VENDING MACHINES

(71) Applicant: Leon Leykin, Pikesville, MD (US)

(72) Inventor: Leon Leykin, Pikesville, MD (US)

( * ) Notice: Subject to any disclaimer, the term of this patent is extended or adjusted under 35 U.S.C. 154(b) by 124 days.

(21) Appl. No.: 18/956,206

(22) Filed: Nov. 22, 2024

(65) Prior Publication Data

US 2025/0171182 A1 May 29, 2025

Related U.S. Application Data

(60) Provisional application No. 63/603,180, filed on Nov. 28, 2023.

(51) Int. Cl.
*B65B 43/44* (2006.01)
*G07F 17/00* (2006.01)

(52) U.S. Cl.
CPC .......... *B65B 43/44* (2013.01); *G07F 17/0078* (2013.01)

(58) Field of Classification Search
CPC ............................ B65B 43/44; G07F 17/0078
See application file for complete search history.

(56) References Cited

U.S. PATENT DOCUMENTS 5,168,795 A * 12/1992 Okada ................. G07F 17/0078 99/336
2010/0025422 A1* 2/2010 Bjornvall ................ G07F 9/105 219/756
2014/0224826 A1* 8/2014 Otzen ..................... G07F 11/10 221/1
2015/0014345 A1* 1/2015 Yeh ......................... G07F 9/105 221/150 HC
2016/0376102 A1* 12/2016 Cook, II ................. G07F 9/105 414/281
2018/0215057 A1* 8/2018 Al Afandi ............... B65B 41/16
2020/0357220 A1* 11/2020 Gauger ................. B65B 25/001

* cited by examiner

*Primary Examiner* — Gene O Crawford
*Assistant Examiner* — Ayodeji H Ojofeitimi
(74) *Attorney, Agent, or Firm* — Nadya Reingand

(57) ABSTRACT

A device for dispensing food trays in a hot food vending machine is provided. The device comprises at least one dispensing bay each having a removable open-top container, a slide assembly, and a horizontal conveyor. The slide assembly comprises a lifting fork that lifts a stack of trays in each container until a top tray exits the container. When the stack of trays is placed into the container channel, the fork is “hidden” in a space under the channel. The horizontal conveyor comprises a pusher mechanism with two arms. At first, in a forward-motion mode, the tray is pushed with the rigid arm until it is under the pivoting arm, whereupon the mechanism switches to a reverse-motion mode to move the pivoting arm to a position in front of the tray. Next, the mechanism switches to the forward-motion mode to push the tray with the pivoting arm to the chute.

6 Claims, 11 Drawing Sheets

DISPENSING DEVICE FOR TRAYS IN HOT FOOD VENDING MACHINES

TECHNICAL FIELD

The present disclosure relates to the field of food vending machines. In particular, the present disclosure relates to a dispensing device for trays in hot food vending machines.

BACKGROUND OF THE INVENTION

Hot food vending machines typically offer food items like hot dogs, hot sandwiches, pizza, fried snacks, and sometimes full meals. They work by keeping food refrigerated or frozen and reheating it using a microwave or infrared heating system before dispensing it to customers.

Food items (e.g., buns for hot dogs) may be stored in specially designed trays inside the refrigerated compartment of the vending machine. Each tray may be dispensed, on demand, to the heating system of the vending machine, and the tray with the heated or cooked food item may be then delivered to a customer.

Dispensing assemblies for trays containing food items consist of mechanisms that manage the movement of the trays from their storage to heating units/systems and subsequently to a dispensing area. Despite advancements, there are challenges persisting in the design and operation of the tray dispensing assemblies for hot food vending machines. More specifically, the tray dispensing assemblies are still prone to frequent mechanical failures, such as jams or misalignment of trays, which may disrupt service and require maintenance, thereby impacting the machine's reliability.

Given the above, more engineering is required to solve the above-mentioned issues of the tray dispensing assemblies.

SUMMARY OF THE INVENTION

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide an improved dispensing assembly design for trays in hot food vending machines (e.g., for trays containing hot dog buns in hot dog vending machines).

The objective above is achieved by the features of the independent claim in the appended claims. Further embodiments and examples are apparent from the dependent claims, the detailed description, and the accompanying drawings.

According to an aspect, a dispensing device for a hot food vending machine is provided. The dispensing device comprises at least one dispensing bay, an open-top container removably mounted in each of the at least one dispensing bay, a slide assembly, and a horizontal conveyor. The open-top container is configured to store a stack of trays each containing at least one food item and comprising a top lid. The slide assembly is configured to lift the stack of trays in the open-top container of each of the at least one dispensing bay until a top tray of the stack of trays exits the open-top container. The horizontal conveyor is configured to receive and transfer the top tray to a tray discharge chute. Each of the at least one dispensing bay comprises a frame and at least one vertical guide rail attached to the frame.

The slide assembly comprises a lifting fork, a first gearmotor, and a first timing belt. The lifting fork is configured to slide along the at least one vertical guide rail, thereby lifting the stack of trays. The first timing belt couples the lifting fork to the first gearmotor.

The open-top container comprises a vertical channel configured to receive the stack of trays, and a support ledge configured to support the stack of trays in the vertical channel. The support ledge is provided in a bottom part of the open-top container so as to form a space for the lifting fork under the vertical channel. The lifting fork is configured to occupy the space when the vertical channel is completely filled with the stack of trays.

The horizontal conveyor comprises a second gearmotor, a second timing belt, a pair of flippers, and a pusher mechanism. The pair of flippers is arranged on opposite sides over the open-top container. The pair of flippers is configured to swing up when the top tray begins to exit the open-top container, and to swing down when the top tray finally exits the open-top container. The pusher mechanism is configured, when driven by the second gearmotor through the second timing belt, to operate in a forward-motion mode and a reverse-motion mode. The pusher mechanism comprises a first pusher arm and a second pusher arm. The second pusher arm is a pivoting arm. The pusher mechanism is configured to operate sequentially as follows: (i) push, in the forward-motion mode, the top tray with the first pusher arm towards the tray discharge chute until the top tray is under the second pusher arm, (ii) switch to the reverse-motion mode to move the second pusher arm along the top lid of the top tray to a position in which the second pusher arm is in front of the top tray, and (iii) switch again to the forward-motion mode to push the top tray with the second pusher arm until the top tray is completely in the tray discharge chute.

The dispensing device thus configured provides efficient (with no jam) dispensing of the trays with the food items in the hot food vending machine from their storage (contained in a refrigerated compartment) to the tray discharge chute, where they may be subsequently grabbed and transported by other dispensing devices or units to a heating assembly.

In one exemplary embodiment, the open-top container comprises a set of vertical slot openings. The presence of such vertical slot openings in the open-top container (e.g., on one or more sides thereof) may allow the vending machine operator to see the tray inventory level in the vertical channel.

In one exemplary embodiment, the horizontal conveyor further comprises at least one proximity switch coupled to the second gearmotor. The proximity switch(es) is (are) configured to: (i) detect that the top tray is under the second pusher arm and cause the second gearmotor to switch to the pusher mechanism to the reverse-motion mode, and (ii) detect that the second pusher arm is in front of the top tray and cause the second gearmotor to switch the pusher mechanism to the forward-motion mode. The use of such proximity switch(es) may provide for more efficient (in terms of proper and faster switching between the forward- and reverse-motion modes) operation of the horizontal conveyor.

In one exemplary embodiment, the horizontal conveyor further comprises a sealing flexible flap separating the horizontal conveyor from the tray discharge chute. The sealing flexible flap is configured to open under a pushing force of the second pusher arm. Such a sealing flexible flap may provide better sealing of the entire dispensing device, thereby keeping the food items fresh for a longer period of time.

In one exemplary embodiment, with the top lid is configured as a pair of overlapping hinged lids. These lids may protect the food item(s) contained in each tray from external contaminants, such as dust, debris, etc. (especially, during the container transport to the vending machine). Also, the overlapping lids allow for better alignment when the trays are stacked, improving stability during the container transport and service. Moreover, the hinged lids are convenient for customers to open and close without removing the entire lid, thereby minimizing heat loss during brief access.

In one exemplary embodiment, the dispensing device further comprises a locator switch coupled to the first gearmotor. The locator switch is configured to: (i) detect that the top tray has completely exited the open-top container, and (ii) cause the first gearmotor to stop sliding the lifting fork along the at least one vertical guide rail. The use of the locator switch may provide for more efficient dispensing of trays in the dispensing device.

Other features and advantages of the present disclosure will be apparent upon reading the following detailed description and reviewing the accompanying drawings.

BRIEF DESCRIPTION OF DRAWINGS

The present disclosure is explained below with reference to the accompanying drawings in which.

DETAILED DESCRIPTION OF THE INVENTION

Figure 1:
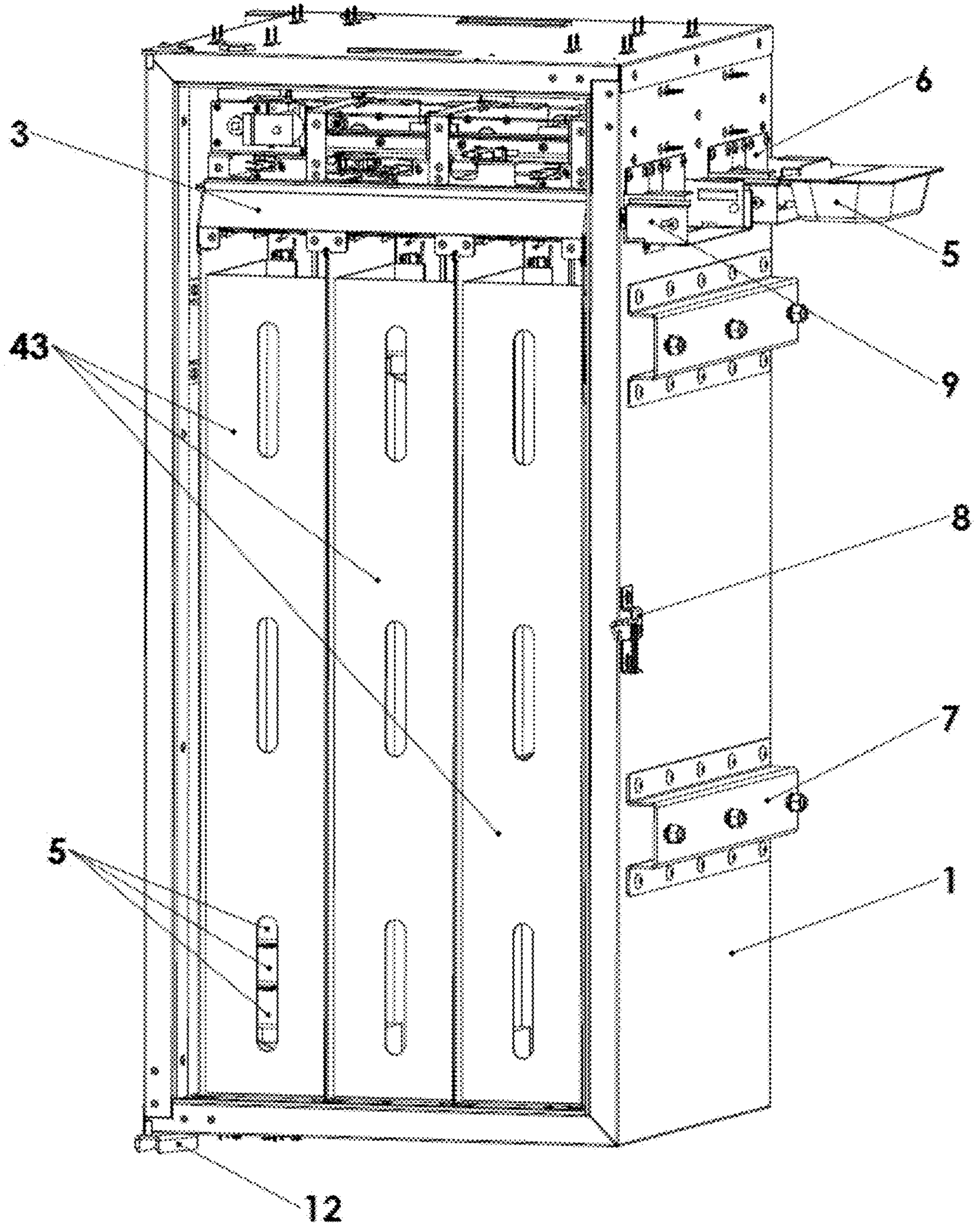
FIG. 1 shows a schematic isometric view of a dispensing device for a hot food vending machine according to one exemplary embodiment.

Various embodiments of the present disclosure are further described in more detail with reference to the accompanying drawings. However, the present disclosure may be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the device disclosed herein may be implemented in practice by using any numbers of the embodiments provided herein. Furthermore, it should be understood that any embodiment of the present disclosure may be implemented using one or more of the elements presented in the appended claims.

The word "exemplary" is used herein in the meaning of "used as an illustration". Unless otherwise stated, any embodiment described herein as "exemplary" should not be construed as preferable or having an advantage over other embodiments.

Any positioning terminology, such as "left", "right", "top", "bottom", "above", "below", "over", "under", "upper", "lower", "horizontal", "vertical", etc., may be used herein for convenience to describe one element's or feature's relationship to one or more other elements or features in accordance with the figures. It should be apparent that the positioning terminology is intended to encompass different orientations of the apparatus disclosed herein, in addition to the orientation(s) depicted in the figures. As an example, if one imaginatively rotates the apparatus in the figures 90 degrees clockwise, elements or features described as "left" and "right" relative to other elements or features would then be oriented, respectively, "above" and "below" the other elements or features. Therefore, the positioning terminology used herein should not be construed as any limitation of the present disclosure.

Furthermore, although the numerative terminology, such as "first", "second", etc., may be used herein to describe various embodiments, elements or features, it should be understood that these embodiments, elements or features should not be limited by this numerative terminology. This numerative terminology is used herein only to distinguish one embodiment, element or feature from another embodiment, element or feature. For example, a first gearmotor discussed below could be called a second gearmotor, and vice versa, without departing from the teachings of the present disclosure.

The exemplary embodiments disclosed herein relate to a dispensing device for trays containing food items in a hot food vending machine. The dispensing device itself may be part of or mounted in a refrigerated compartment of the vending machine. The dispensing device comprises at least one dispensing bay, an open-top container removably mounted in each of the at least one dispensing bay, a slide assembly, and a horizontal conveyor. The trays are stacked in each container. The slide assembly comprises a lifting fork configured, when driven by a gearmotor via a timing belt, to lift the stack of trays in each container until a top tray exits the container. When the stack of trays is completely placed into the vertical channel of the container, the lifting fork is "hidden" in a space formed under the vertical channel by means of a bottom ledge. The horizontal conveyor comprises a pusher mechanism configured, when driven by a gearmotor via a timing belt, to operate in a forward-motion mode and a reverse-motion mode. The pusher mechanism comprises two pusher arms, with one being rigidly fixed and another being pivoting. The pusher mechanism is configured to operate sequentially as follows: (i) push, in the forward-motion mode, the tray with the rigid pusher arm towards a tray discharge chute until the tray is under the pivoting pusher arm, (ii) switch to the reverse-motion mode to move the pivoting pusher arm along the top lid of the tray to a position in which it is in front of the tray, and (iii) switch again to the forward-motion mode to push the top tray with the pivoting pusher arm until the tray is completely in the tray discharge chute.

Figure 8A:
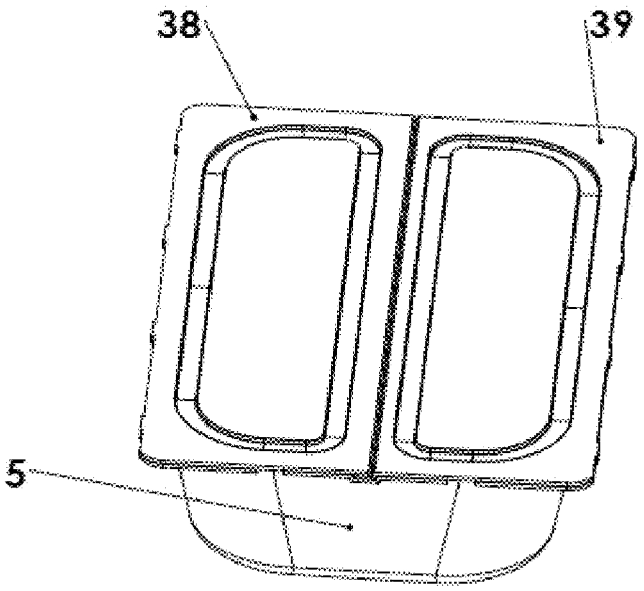
FIGS. 8A and 8B show schematic isometric views of one tray with closed (FIG. 8A) and open (FIG. 8B) lids.
Figure 8B:
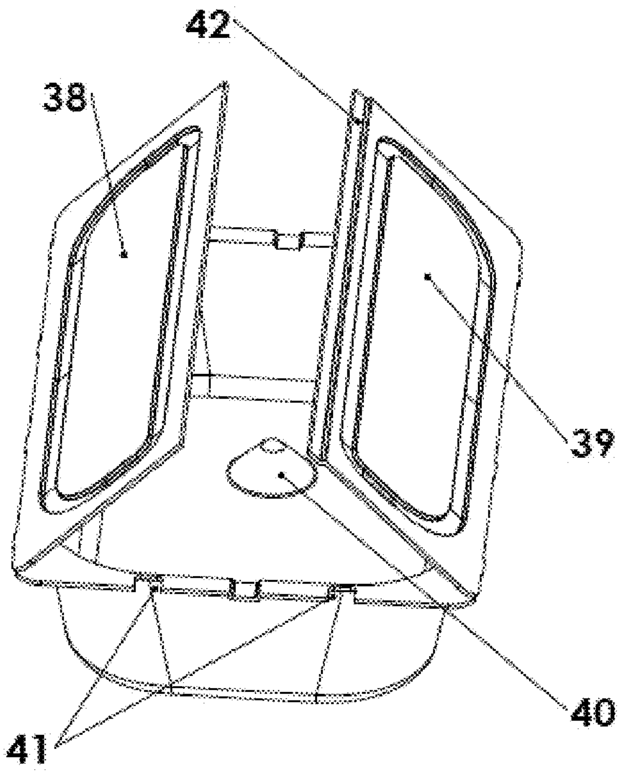

FIG. 1 shows a schematic isometric view of a dispensing device 1 for a hot food vending machine according to one exemplary embodiment. The dispensing device 1 is designed to store and dispense trays 5 having fresh buns or other food items placed therein by a vending dispensing machine operator. Preferably, the trays 5 have overlapping hinged lids 38, 39 (see FIGS. 8A and 8B), are rectangular in shape with rounded corners and have positioning cones 40 on the tray bottom that will enable the tray 5 to be positioned and moved in the vending machine during the dispensing and cooking process of the food items (e.g., hot dogs or sandwiches). To overlap each other and provide better tray sealing, one of the lids 38, 39 of each tray 5 may have a sealing offset 42. Each tray 5 may also have openings or voids 41 in the tray rim, so that the lids 38, 39 may be easily opened. In general, the dimensions of the trays 5 need to match the dimension of the container 43.

Figure 9A:
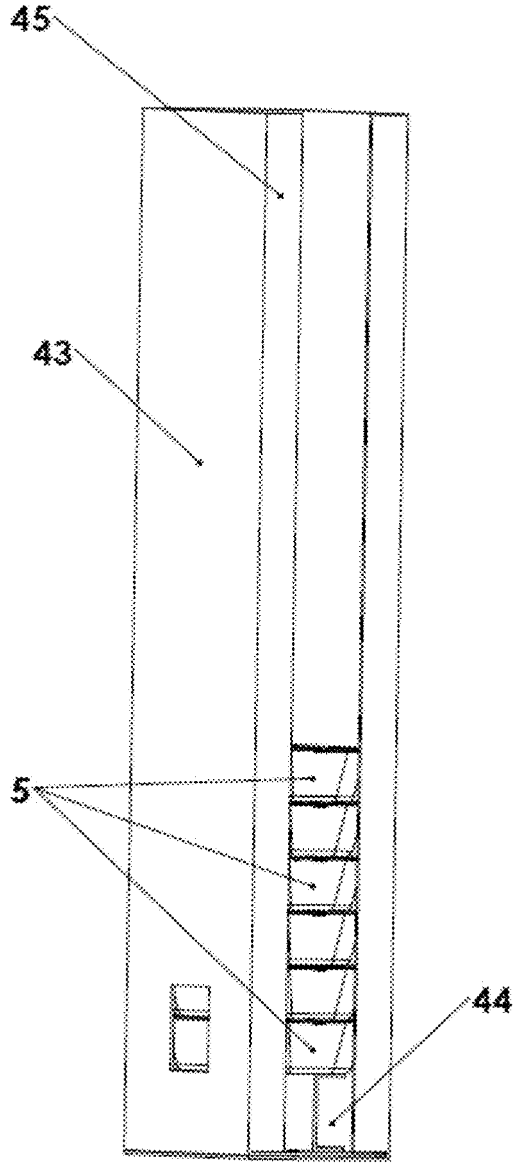
FIGS. 9A and 9B show schematic isometric views of the open-top container containing the stack of trays, with the container comprising vertical slot openings and a container lid (used during the container transport)
Figure 9B:
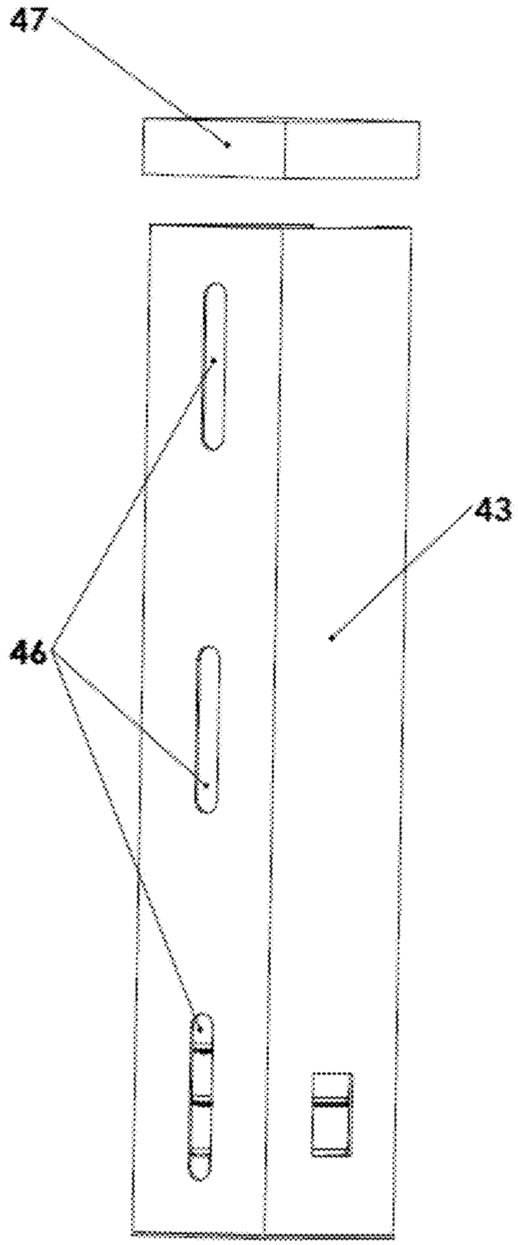

The trays 5 are stacked vertically in one of six tray containers 43 (see FIGS. 2, 3, 9A, and 9B) that have an open center (vertical) channel and a bottom ledge 44. The ledge 44 provides a space for a lifting fork 4 to enter the bottom of the container 43 when it is full of the trays 5 and the open center channel allows the lifting fork 4 to move the stack of trays 5 vertically in back 14 and front 15 sets of dispensing bays 2 (see FIG. 2), thereby transporting the trays 5 one by one out of the top of the container 43. In the front of the container 43, there is a series of vertical slot openings 46 (see FIG. 9B) that show the tray inventory level. The container 43 will have a snug fitting top lid 47 that will compress the stacked trays 5 keeping their lids closed tightly and fortifying the container 43 (see FIG. 9B), so that it may hold the trays 5 securely during the container transport and movement to the vending machine. The container 43 also has a vertical opening in its back 45 (see FIG. 9A), which is required to allow the lifting fork 4 to penetrate the container interior and move the trays 5 in the container 43 vertically.

Figure 2:
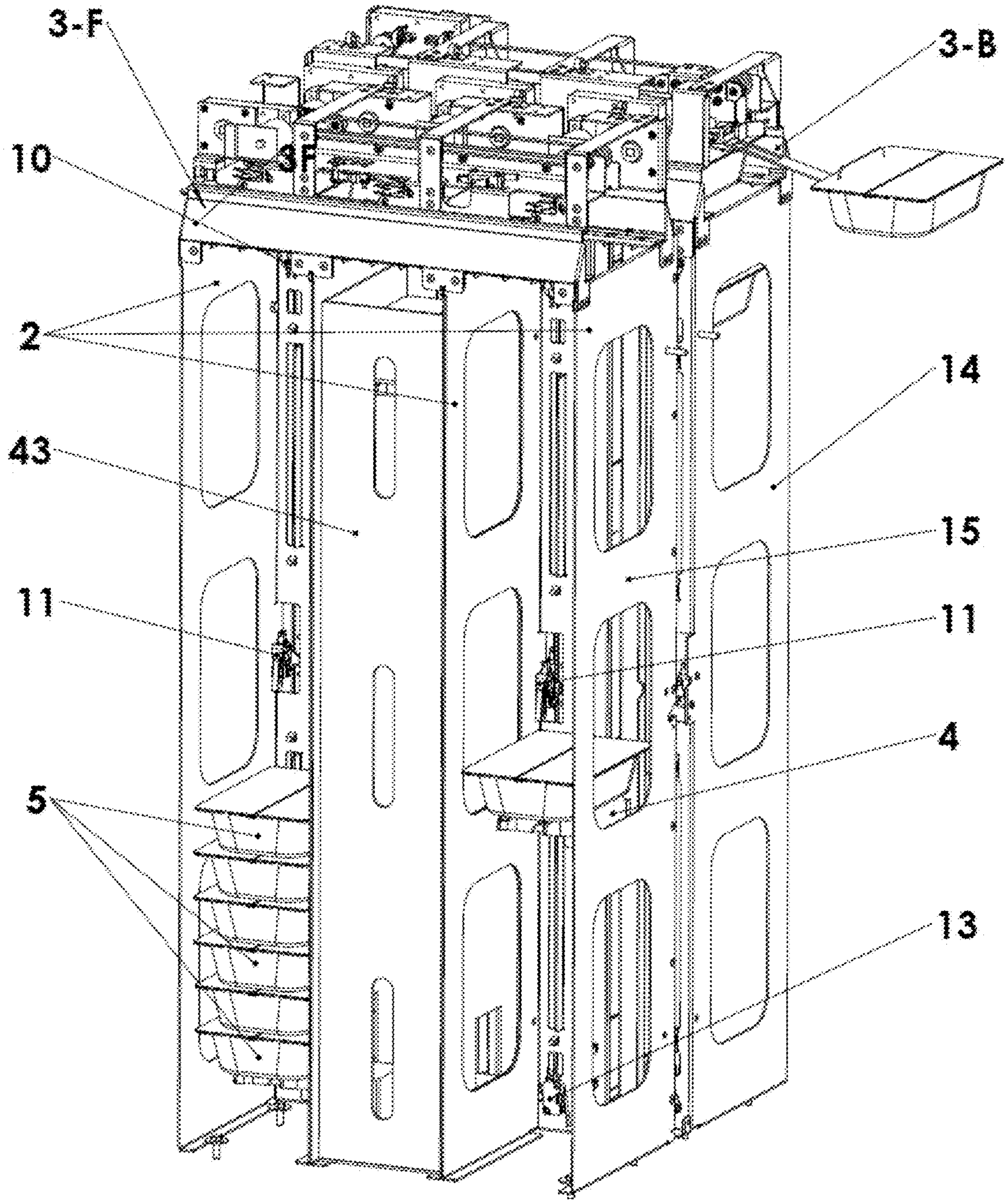
FIG. 2 shows a schematic isometric view of dispensing bays and a horizontal conveyor used in the dispensing device, with each of the dispensing bays comprising a removably mounted open-top container containing a stack of trays with food items.
Figure 3:
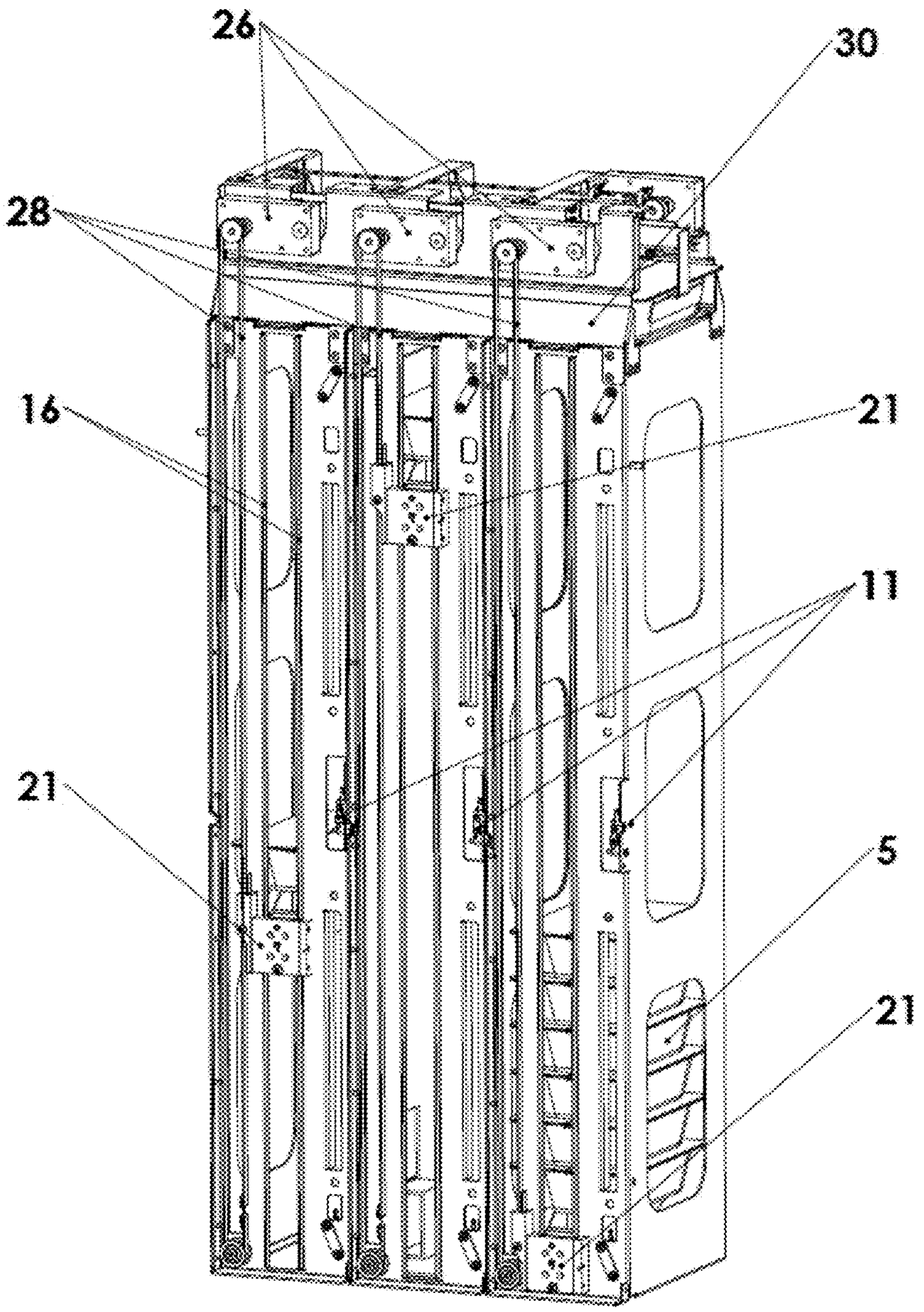
FIG. 3 shows a schematic isometric view of a slide assembly used in the dispensing device to deliver the trays contained in each open-top container, one by one, to the horizontal conveyor.
Figure 4:
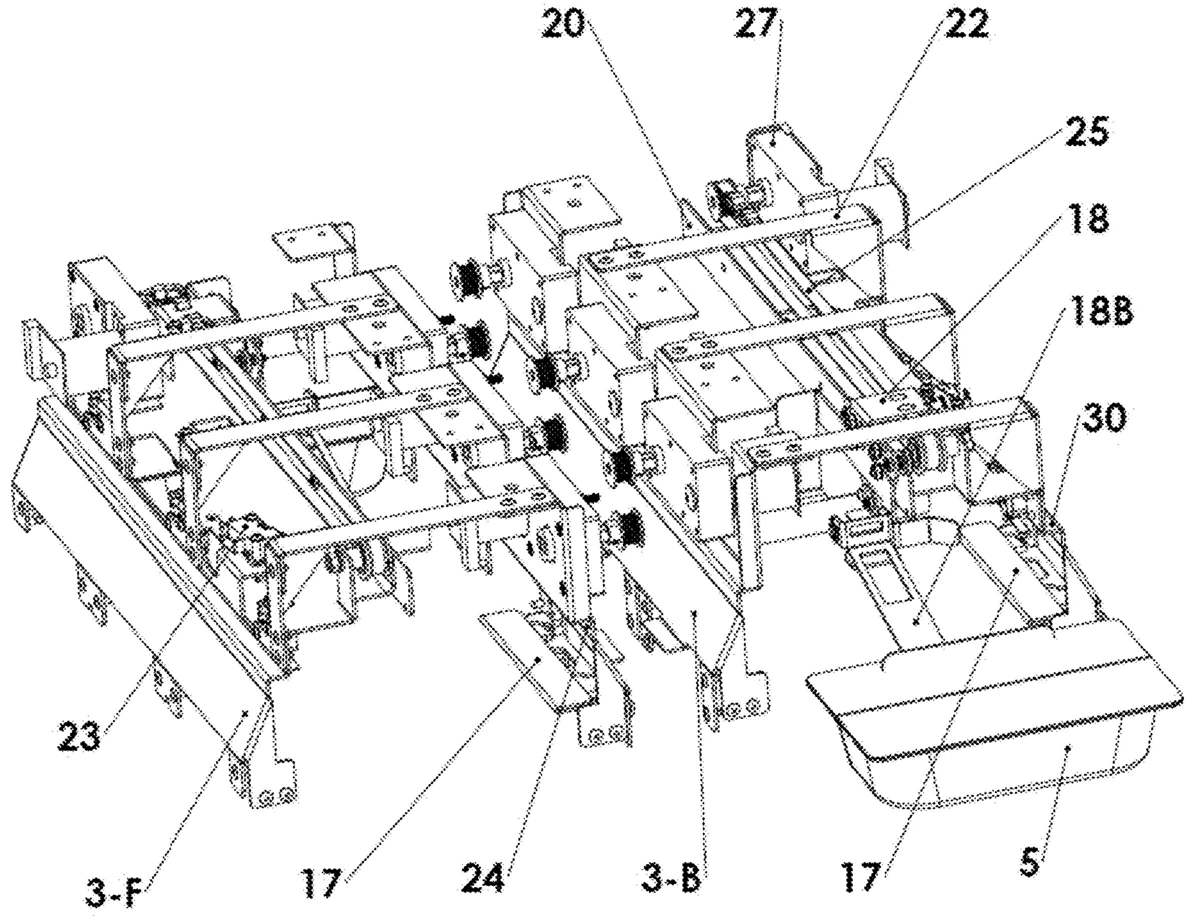
FIG. 4 shows a schematic isometric view of the horizontal conveyor used in the dispensing device to deliver each tray to its final position in a tray discharge chute (not shown)
Figure 10:
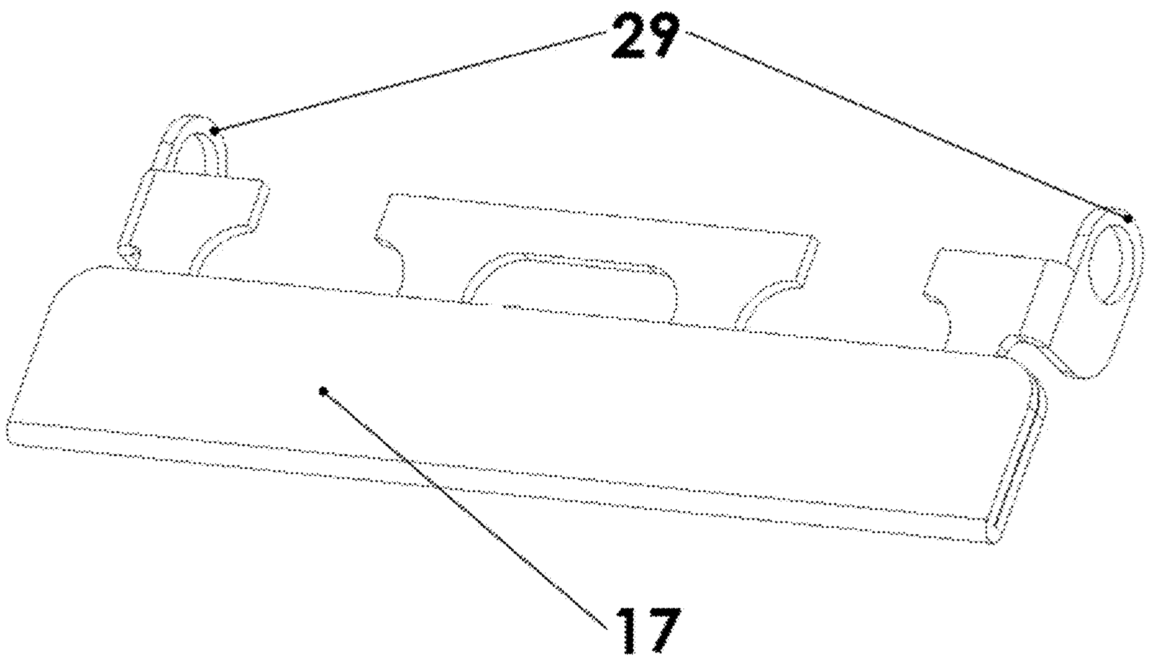
FIG. 10 shows a schematic isometric view a flipper that may be used in the horizontal conveyor.

Each container 43 is placed into one of six dispensing bays 2 (see FIGS. 1 and 2). Each dispensing bay 2 is provided with a slide assembly 21 comprising the lifting fork 4 that moves vertically on guide rails 16 being part of the frame of the dispensing bay 2. The lifting fork 4 is lifted on the guide rails 16 by a timing belt 28 driven by a gearmotor 26 and will be stopped by a locater switch 10 when the top tray 5 pushes through a pair of flippers 17 (see FIG. 10) that are part of a horizontal conveyor assembly 3 comprising two horizontal conveyors 3-F (front) or 3-B (back) (see FIGS. 2, 4). After the tray 5 is pushed away from its entry position above the dispensing bay 2, the horizontal conveyor flippers 17 swing down to their horizontal position. Each of the flippers 17 may comprise pivot holes 29 (see FIG. 10) configured to receive sleeve bearings that allow the flippers 17 to move easily to open and closed positions. When the flippers 17 are in the horizontal position, they provide a sliding surface for the tray 5 to move along the corresponding horizontal conveyor. The flippers 17 must be able to swing up; otherwise, the tray 5 will not be able to enter the space of the horizontal conveyor. Once the top tray 5 comes off its stack from the container 43, it has to pass by one or two other dispensing bays 2 or containers 43 (depending on the position of its original dispensing bay 2 or container 43), and the flippers 17 need to be in the horizontal (closed) position, so that the top tray 5 passes over those modules without jamming.

Figure 5A:
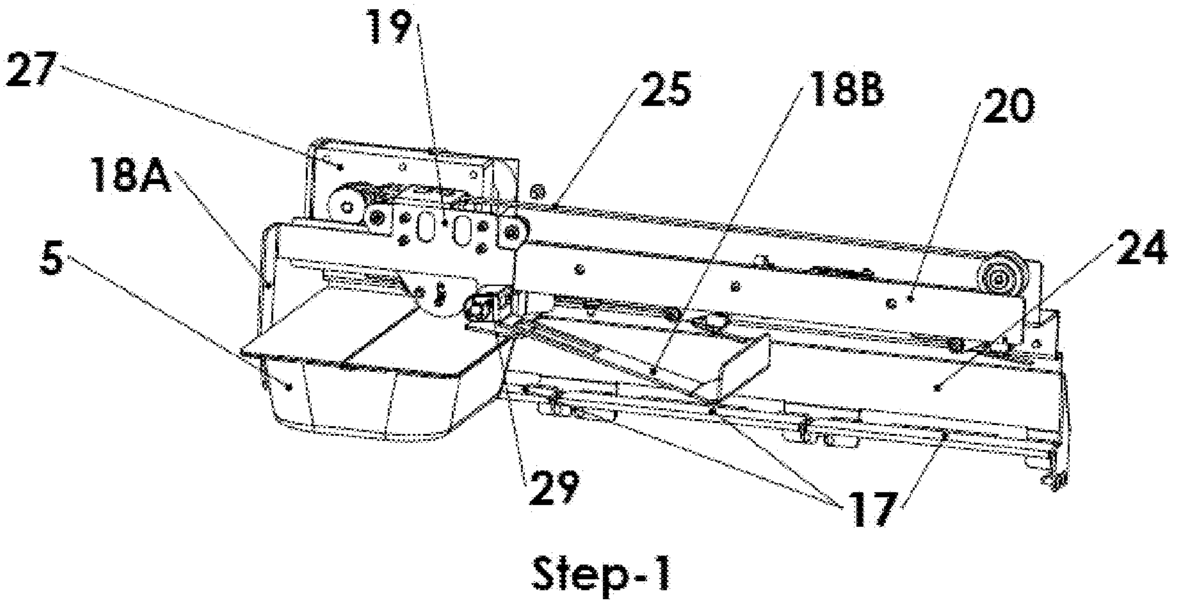
FIGS. 5A-5C schematically explains the three-step operation of a pusher mechanism used in the horizontal conveyor to push each tray to its final position in the tray discharge chute.
Figure 5B:
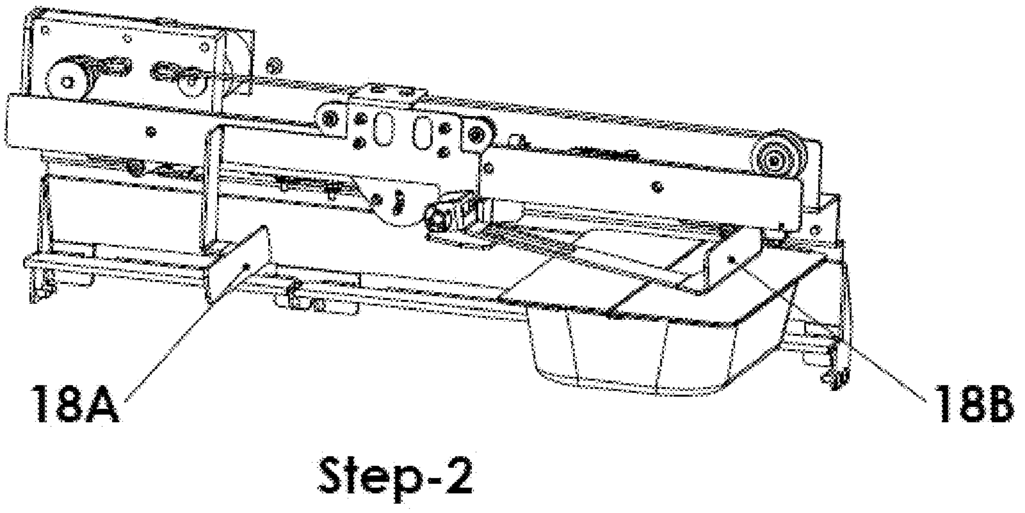
Figure 5C:
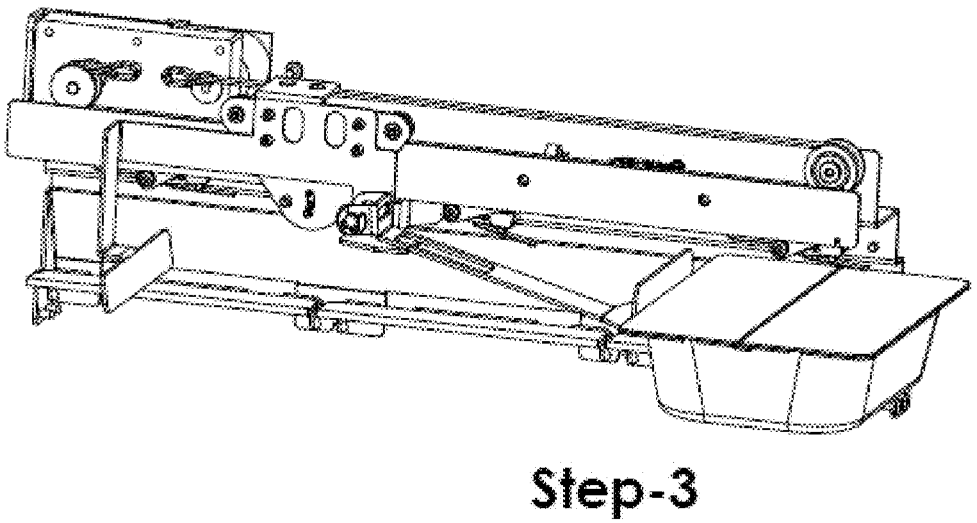

The horizontal conveyor 3F or 3B transfers the tray 5 from its location above the dispensing bay 2 where it was placed, out to a tray discharge chute 9 (see FIG. 1). The two horizontal conveyors, front 3F and back 3B, each service three of the six dispensing bays 2 (i.e., the front horizontal conveyor 3F serves the front set 15 of the dispensing bays 2, while the back horizontal conveyor 3B serves the back set 14 of the dispensing bays 2). A pusher mechanism 18 that is part of each horizontal conveyor comprises two different pusher parts or arms 18A, 18B, a trolley 19, and a rail 20 for the trolley rollers (see FIGS. 4, 5A-5C). The pusher mechanism 18 is moved forward and backward by a timing belt 25 driven by an electric gearmotor 27. The trolley 19 provides rolling movement of the pusher mechanism 18 along the rail 20. The tray 5 is initially pushed through, e.g., the first two thirds of a horizontal conveyor channel 24 by the first (rigid) pusher arm 18A (see FIG. 5A-step 1) and then the pusher mechanism motion is reversed. In the reverse-motion mode, the second (pivoting) pusher arm 18B rides over the lids 38, 39 of the tray 5 (see FIG. 5B-step 2) until its end passes behind the tray 5 and drop into a position where it may push the tray 5 (see FIG. 5C-step 3). The pusher mechanism 18 is driven to reverse its direction and the tray 5 again moves forward to the tray discharge chute 9. Each of the horizontal conveyors 3F and 3B comprises a frame 30 and top supports 22 that reinforce the top of each horizontal conveyor. A locator switch 23 may be used to control movement of the pusher mechanism 18.

At the horizontal conveyor discharge opening (i.e., the exit point of the dispensing device 1) there is a flexible flap 6 (see FIG. 1) that seals the discharge opening. When the tray 5 reaches the flap 6, the pushing force of the pivoting pusher arm 18B is sufficient to open the flap 6. The tray 5 continues to move with the flap 6 sliding against the top of the tray 5 until it is past the end of the tray 5 which allows the flap 6 to partially close. The pivoting pusher arm 18B continues to push the tray 5 outside of the horizontal conveyor until it drops off onto the tray discharge chute 9. Being extended outside of the horizontal conveyor, the pivoting pusher arm 18B prevents the flap 6 from fully sealing the discharge opening; when the pusher mechanism 18 is finally reversed and returns into the dispensing device 1, the flap 6 returns to its sealing position.

The control of the various movements of the trays 5 inside the dispensing device 1 and their exit out of the dispensing device 1 as described above is accomplished with use of many proximity switches, the timing belts driven by the electric gearmotors and a control board that provides the sequence of all operations. For example, a container availability switch 11 (see FIGS. 1, 2) may be used to verify that the container 43 is properly installed in the corresponding dispensing bay 2, and a tray bottom position switch 13 may be used to put the lifting fork 4 into the bottom or home position inside the space formed by the ledge 44 when the container 43 is emptied.

With reference to FIG. 1, the dispensing device 1 may be mounted in the vending machine by means of two (or more) mounting brackets 7. Also, the dispensing device 1 may comprise a latch 8 that secures its access door (not shown) attached to the dispensing device 1 via a door hinge 12.

Figure 6:
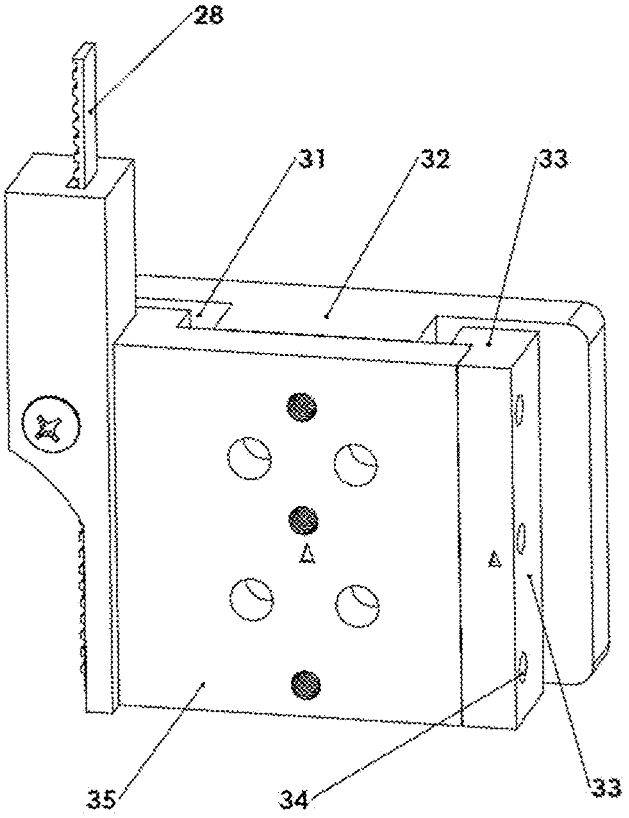
FIG. 6 shows a schematic isometric view of an exemplary slider that may be used in the slide assembly to hold and move a lifting fork along vertical guide rails in each dispensing bay.
Figure 7:
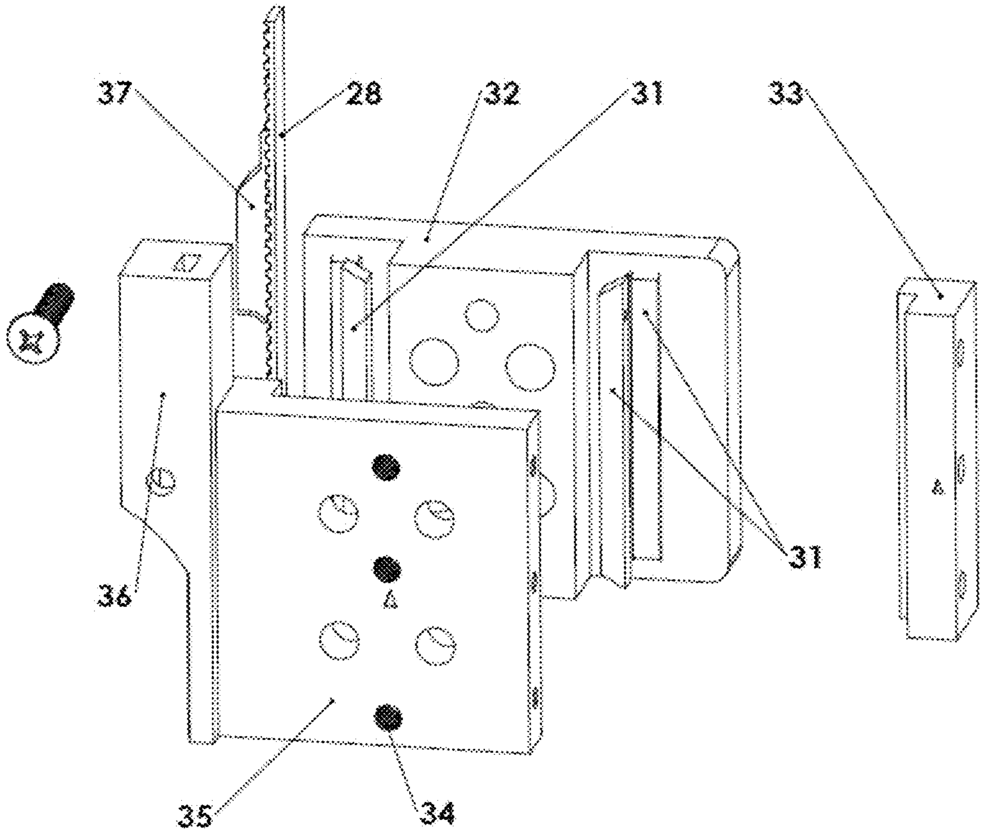
FIG. 7 shows a schematic exploded view of the slider.

FIG. 6 shows a schematic isometric view of an exemplary slider that may be used in the slide assembly 21 to hold and move the lifting fork 4 along the vertical guide rails 16 in each dispensing bay 2. FIG. 7 shows a schematic exploded view of the same slider. As shown, the slider comprises a back base 32 that is a portion of the slider which rides the back portion of the dispensing bay 2, and a front base 35 that is a mounting location for the lifting fork 4. The slider further comprises inserts 31 that create flat bearing surfaces with low friction, an adjustable side piece 33 that allows clearance adjustment for the guide rail 16, piece fasteners 34 that adjust clearance between the slider side and the vertical guide rails 16 in the dispensing bay 2, as well as a clamp body 36 and a clamp latch 37 that are used to attach the slider to the timing belt 28.

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures may not be used to advantage.

The invention claimed is:

1. A dispensing device for a hot food vending machine, the dispensing device comprising:
- at least one dispensing bay,
- an open-top container removably mounted in each of the at least one dispensing bay, the open-top container being configured to store a stack of trays, each tray of the stack of trays containing at least one food item and comprising a top lid;
- a slide assembly configured to lift the stack of trays in the open-top container of each of the at least one dispensing bay until a top tray of the stack of trays exits the open-top container; and
- a horizontal conveyor configured to receive and transfer the top tray to a tray discharge chute;
- wherein each of the at least one dispensing bay comprises a frame and at least one vertical guide rail attached to the frame;
- wherein the slide assembly comprises:
  - a lifting fork configured to slide along the at least one vertical guide rail, thereby lifting the stack of trays;
  - a first gearmotor; and
  - a first timing belt coupling the lifting fork to the first gearmotor;
- wherein the open-top container comprises:
  - a vertical channel configured to receive the stack of trays; and
  - a support ledge configured to support the stack of trays in the vertical channel, the support ledge being provided in a bottom part of the open-top container so as to form a space for the lifting fork under the vertical channel, the lifting fork being configured to occupy the space when the vertical channel is completely filled with the stack of trays; and
- wherein the horizontal conveyor comprises:
  - a second gearmotor;
  - a second timing belt;
  - a pair of flippers arranged on opposite sides over the open-top container, the pair of flippers being configured to:
    - swing up when the top tray begins to exit the open-top container; and
    - swing down when the top tray finally exits the open-top container; and
  - a pusher mechanism configured, when driven by the second gearmotor through the second timing belt, to operate in a forward-motion mode and a reverse-motion mode, the pusher mechanism comprising a first pusher arm and a second pusher arm, the second pusher arm being a pivoting arm, the pusher mechanism being configured to:
    - push, in the forward-motion mode, the top tray with the first pusher arm towards the tray discharge chute until the top tray is under the second pusher arm;
    - switch to the reverse-motion mode to move the second pusher arm along the top lid of the top tray to a position in which the second pusher arm is in front of the top tray; and
    - switch again to the forward-motion mode to push the top tray with the second pusher arm until the top tray is completely in the tray discharge chute.

2. The dispensing device of claim 1, wherein the open-top container comprises a set of vertical slot openings.

3. The dispensing device of claim 1, wherein the horizontal conveyor further comprises at least one proximity switch coupled to the second gearmotor and configured to:
- detect that the top tray is under the second pusher arm and cause the second gearmotor to switch to the pusher mechanism to the reverse-motion mode; and
- detect that the second pusher arm is in front of the top tray and cause the second gearmotor to switch the pusher mechanism to the forward-motion mode.

4. The dispensing device of claim 1, wherein the horizontal conveyor further comprises a sealing flexible flap separating the horizontal conveyor from the tray discharge chute, the sealing flexible flap being configured to open under a pushing force of the second pusher arm.

5. The dispensing device of claim 1, wherein the top lid is configured as a pair of overlapping hinged lids.

6. The dispensing device of claim 1, further comprising a locator switch coupled to the first gearmotor and configured to:
- detect that the top tray has completely exited the open-top container; and
- cause the first gearmotor to stop sliding the lifting fork along the at least one vertical guide rail.

* * * * *